(12) United States Patent
Kittrell

(10) Patent No.: US 7,348,288 B1
(45) Date of Patent: *Mar. 25, 2008

(54) CATALYST COMPOSITION

(75) Inventor: James R. Kittrell, Amherst, MA (US)

(73) Assignee: KSE Inc., Sunderland, MA (US)

( * ) Notice: Subject to any disclaimer, the term of this patent is extended or adjusted under 35 U.S.C. 154(b) by 321 days.

This patent is subject to a terminal disclaimer.

(21) Appl. No.: 09/684,173

(22) Filed: Oct. 6, 2000

Related U.S. Application Data

(62) Division of application No. 09/324,574, filed on Jun. 2, 1999, now Pat. No. 6,179,972.

(51) Int. Cl.
*B01J 31/00* (2006.01)
*B01J 21/08* (2006.01)
*B01J 23/42* (2006.01)
*B01J 23/43* (2006.01)

(52) U.S. Cl. ............... 502/102; 502/242; 502/254; 502/305; 502/309; 502/313; 502/339; 502/350

(58) Field of Classification Search ............ 502/2, 502/300, 302, 305, 313, 339, 102, 232, 240, 502/242, 254, 309, 350; 588/205
See application file for complete search history.

(56) References Cited

U.S. PATENT DOCUMENTS

| | | | | | |
|---|---|---|---|---|---|
| 3,640,817 | A | * | 2/1972 | O'Hara | 208/111.3 |
| 3,887,455 | A | * | 6/1975 | Hamner et al. | 208/111.3 |
| 5,877,391 | A | * | 3/1999 | Kanno et al. | 588/205 |
| 6,037,289 | A | * | 3/2000 | Chopin et al. | 502/2 |
| 6,086,749 | A | * | 7/2000 | Kramer et al. | 208/213 |
| 6,179,971 | B1 | * | 1/2001 | Kittrell et al. | 204/158.2 |
| 6,464,951 | B1 | * | 10/2002 | Kittrell et al. | 423/240 R |
| 6,596,664 | B2 | * | 7/2003 | Kittrell et al. | 502/182 |

* cited by examiner

*Primary Examiner*—Thao Tran
(74) *Attorney, Agent, or Firm*—Bachman & LaPointe, P.C.

(57) ABSTRACT

A process comprises passing a contaminated gaseous stream through a photocatalytic stage and, thereafter, through a catalytic stage.

2 Claims, No Drawings

US 7,348,288 B1

CATALYST COMPOSITION

CROSS-REFERENCE TO RELATED APPLICATION

The instant application is a divisional of application Ser. No. 09/324,574 filed Jun. 2, 1999 now U.S. Pat. No. 6,179,972.

BACKGROUND OF THE INVENTION

The present invention is drawn to a process and catalyst for destruction of contaminants in a gaseous stream (preferably air) into less harmful products by irradiating the contaminated air with ultraviolet light in a first photocatalytic stage wherein the photocatalyst is irradiated with ultraviolet light while in contact with the contaminated air to convert at least a portion of the contaminants into carbon dioxide. The contaminated air then is passed into a second catalytic stage, wherein the contaminant is exposed to a catalyst without further heating of the contaminated air. Surprisingly, it is found that the pretreatment in the first photocatalytic stage increases overall process efficiency, by efficiently releasing heat utilized by the catalytic stage and by producing intermediate species which are efficiently converted in the second catalytic stage without forming harmful byproducts.

In spite of decades of effort, a significant need remains for an advanced technology to control stationary source emissions of volatile organic compounds (VOCs) as for example benzene, chlorinated volatile organic compounds (CVOCs) as for example trichloroethlyene, and toxic air pollutants (TAPs) as for example acrylonitrile. A particular need exists for technology which controls emissions from industrial processes and other applications where VOCs and TAPs are present in high flow rate air streams.

Pollution control in high flow rate air streams is becoming recognized as a major environmental control issue for the United States industrial community at large. For example, the control of emissions associated with solvent degreasing operations is necessary, including the emissions associated with exhaust ventilation fans. Also, air stripping of contaminated groundwater produces air emissions for which current technology provides no satisfactory solution. Catalytic combustors are available, but require processing tremendous volumes of air and result in uneconomic performance. Thermal incinerators require excessive supplemental fuel for dilute mixtures, and exhibit uncertain selectivity when CVOC's are involved. Gas membrane processes are only now emerging for gas separation, and are ill-suited for dilute mixtures. Pressure swing adsorption using zeolites or resins is not applicable to dilute mixtures, and rotating wheel adsorbers are uneconomic for such dilute concentrations of organics. Packed bed activated carbon adsorption is widely practiced, but creates a hazardous solid waste which is increasingly difficult to manage. Carbon regeneration by steam is costly, and is generally economic only for very large scale operations. Landfill options for spent carbon will become more limited, as it involves transportation and disposal of hazardous wastes, particularly for CVOC applications.

Control of indoor air pollution is also of growing importance, with the objective of enhancing workplace environmental health and safety protection. The Occupational Safety and Health Administration (OSHA) is promulgating new regulations to reduce workplace exposure to indoor air contaminants such as CVOCs. Many CVOCs are particularly toxic. Certain CVOCs are suspected carcinogens, others are linked to possible birth defects, and still others are suspected active precursors in the destruction of the stratospheric ozone layer. Of the 189 targeted air toxics in the Clean Air Act Amendments of 1990, about one-third of the compounds are chlorinated.

In spite of considerable efforts of researchers in the field, most UV photocatalysts exhibit shortcomings in catalyst activity, selectivity, and deactivation which limit their commercial utility for air pollution control.

Researchers have studied titania photocatalysis, although not achieving the benefits of the present invention. Raupp has reported titania photocatalysts for the UV oxidation of organics in air (see Raupp, G. B., et al., "Destruction of Organics in Gaseous Streams Over UV-Excited Titania", $85^{th}$ Annual Meeting, Air & Waste Management Association, Kansas City, Jun. 21-26, 1992). The activity of a titania photocatalyst rapidly declines with time-on-stream with trichloroethylene (TCE) in air (see Raupp, G. B., "Photocatalytic Oxidation for Point-of-Use VOC Abatement in the Microelectronics Fabrication Industry", Air & Waste Management Association, $87^{th}$ Annual Meeting, Cincinnati, Ohio, Jun. 19-24, 1995). Ollis describes photocatalytic reactors and reports that TCE photocatalysts in air can lead to 75 ppm(v) of phosgene in the reactor product in the photocatalytic oxidation of organics over a thin titania bed (see Ollis, D. F., in Photocatalytic Purification and Treatment of Water and Air, 481-494, Elsevier, NY, 1993; and Peral, J. and D. F. Ollis, "Heterogeneous Photocatalytic Oxidation of Gas-Phase Organics for Air Purification", J. Catalysis, 136, 554-564, 1992). Pichat has reported great difficulty oxidizing aromatics in the gas phase with a titania photocatalyst (see Pichat, P., in Photoelectrochemistry, Photocatalysis and Photoreactors, 425-455, Reidel Publishing, Boston, 1985). Researchers at Purdue have investigated gas phase photocatalysis of TCE using titania on a concentric reactor wall around a UV light source (see Wang, K. and B. J. Marinas, in Photocatalytic Purification and Treatment of Water and Air, 733-737, Elsevier, 1993). They employed residence times of over 6 seconds, and found evidence of byproducts, suspected to be phosgene. Teichner reports that byproduct formation with titania photocatalysts is the rule, not the exception (see Teichner, S. J. and N. Formenti, in Photoelectrochemisty, Photocatalysis and Photoreactors, 457-489, Reidel Pub, Boston, 1985). Nutech Energy Systems has disclosed titania impregnated on a fiberglass mesh (see U.S. Pat. No. 4,892,712 issued Jan. 9, 1990; U.S. Pat. No. 4,966,759 issued Oct. 30, 1990; and U.S. Pat. No. 5,032,241 issued Jul. 16, 1991). A technical paper on the Nutech technology disclosed a gas phase residence time of 8.4 seconds and evidence of byproducts formation up to 34 seconds residence time (see Al-Ekabi H., et al., in Photocatalytic Purification & Treatment of Water and Air, 719-725, Elsevier, NY, 1993). The University of Wisconsin investigators have used 100 second residence time for photocatalytic destruction of gas phase TCE using titania (see Yamazaki-Nishida, S., et al., "Gas Phase Photocatalytic Degradation on Titania Pellets of Volatile Chlorinated Organic Compounds from a Soil Vapor Extraction Well", J. Soil Contamination, September, 1994; Fu, X., W. A. Zeltner, and M. A. Anderson, "The Gas-Phase Photocatalytic Mineralization of Benzene on Porous Titania-Based Catalysts", Applied Catalysis B: Environmental, 6, 209-224, 1995; and U.S. Pat. No. 5,035,078 issued Jul. 30, 1991).

Titania has been used for decades in photocatalysis (see Formenti, M., et al., "Heterogeneous Photocatalysis for Oxidation of Paraffins", Chemical Technology 1, 680-686, 1971 and U.S. Pat. No. 3,781,194 issued Dec. 25, 1973). Due to the high absorption of UV light by titania, about 99% of the incident UV radiation is absorbed within the first 4.5 microns on titania (see Peral, J. and D. F. Ollis, "Heterogeneous Photocatalytic Oxidation of Gas-Phase Organics for Air Purification", J. Catalysis, 136, 554-564, 1992). Hence, the patent literature discloses methods to distribute the titania in thin layers in an attempt to overcome this deficiency. In 1973, Teichner disclosed a method of using titania supported on a matrix in a thin film reactor to oxidize hydrocarbons to aldehydes and ketones (see U.S. Pat. No. 3,781,194 issued Dec. 25, 1973). Titania has been deposited in thin layers on glass wool, on a ceramic membrane, and the wall of a reactor (see U.S. Pat. No. 4,888,101 issued Dec. 19, 1989; U.S. Pat. No. 5,035,078 issued Jul. 30, 1991; U.S. Pat. No. 4,966,665 issued Oct. 30, 1990). Raupp has disclosed titania for photocatalytic use when mixing two gas streams, and included thin bed catalytic reactors (see U.S. Pat. No. 5,045,288 issued Sep. 3, 1991).

The requirement of thin film reactors is a major deficiency, leading to greatly increased cost and complexity in commercial reactor construction. For example, a commercial reactor may require 500 to 1000, or more, UV lamps. Methods to provide illumination of thin films of catalyst require a huge surface area for impingement of incident UV radiation. For example, one common method of deployment of catalyst in a thin film is to coat the interior of a reactor tube, which surrounds a UV lamp in the centerline of the tube. This method, then, requires that 500 to 1000, or more, individual reactor tubes be constructed and assembled, which is costly and cumbersome. In addition, the flow must be equally split and balanced among the 500 to 1000, or more, reactor tubes in parallel operation, which is difficult and costly to accomplish and maintain. Further, to prevent the gas from bypassing the catalyst by preferentially flowing between the UV tube and the thin catalyst layer, the gap between the UV lamp and the catalyst must be very small or a turbulent promoting flow disruption must be inserted between the UV lamp and the catalyst. These lead to a very high pressure drop for the gas flowing through the reactor. Particularly for the large flow rates of gas in commercial reactors, this leads to high pressure drop, requiring both expensive gas compressors and a cooling device to remove the heat of compression of the gas. For these reasons, little or no commercial practice of thin film titania photocatalysts has been accomplished.

U.S. Pat. No. 4,966,665 discloses the use of titanium dioxide as a photocatalyst for destruction of chlorine-containing organic compounds in an oxygen-bearing vent gas. The method was used in a system wherein the titanium dioxide was supported on the wall of a reactor through which the vent gas is passed. This is an ineffective reactor design for large gas flows, requiring a very large number of small diameter parallel tubes among which the flow must be equally balanced. Further, the cost of such a reactor is very high compared to a single large diameter reactor. Still further, when a vent gas containing 30 ppm TCE was contacted with titanium dioxide for 26 seconds, 90% destruction of TCE was obtained. However, the analysis of the reactor products revealed the formation of byproducts such as 4 ppm phosgene and 1 ppm carbon tetrachloride which are more hazardous than TCE.

U.S. Pat. No. 5,045,288 discloses a method of removing organic contaminants from a gaseous stream, wherein a mixing step is conducted, combining (a) a gaseous oxygen bearing stream and (b) a contaminated stream. This mixture is then passed over a photocatalyst exposed to UV radiation of wavelength not greater than 600 nm. The reaction conditions must be preselected to prevent formation of a liquid phase on the catalyst. Only when the reactor comprises a body portion having a window for passing visible light, the photocatalyst may be selected from the group consisting of titanium dioxide, zirconium oxide, antimony oxide, zinc oxide, stannic oxide, cerium oxide, tungsten oxide, and ferric oxide. The invention is deficient in that it requires mixing two streams, requires avoiding liquid phases, and requires a visible light window, all of which are impractical in commercial systems. Further, the catalyst compositions are not effective.

U.S. Pat. No. 4,888,101 discloses a system for photocatalysis wherein a semiconductor is entrapped in a fiber mesh. U.S. Pat. Nos. 4,892,712 and 4,966,759 disclose a photocatalyst for detoxifying organic pollutants from a fluid, comprising a substrate in the form of a plurality of layers of a filamentous, fibrous, or stranded base material, and a photoreactive metal semiconductor material bonded to surfaces of said layers. The photoreactive material is selected from anatase, CdS, CdSe, $ZnO_2$, $WO_3$ and $SnO_2$. This disclosure is of limited value because the substrate leads to a high pressure drop under conditions providing intimate contacting of the fluid flowing through or by the substrate. Further, the base material is generally of low surface area, leading to poor overall reactor performance. Still further, the design also generally requires a sleeve of this material around each bulb, leading to a costly reactor design. Finally, the photoreactive metal semiconductors are not of high photocatalytic activity. U.S. Pat. No. 5,032,241 provides a similar system for killing microorganisms in a fluid.

U.S. Pat. No. 4,780,287 discloses a method of decomposing volatile organic halogenated compounds by passing the gas through silica gel or quartz chips, and the bed is thereafter irradiated with UV light. Ozone or hydrogen peroxide are added to an aqueous phase. The system lost catalytic activity and required heating with nitrogen gas to restore the decomposing activity. Presumably, this loss of activity was due to the decomposition of the CVOC, rather than promoting its complete oxidation. U.S. Pat. No. 4,941, 957 discloses a method for decomposing CVOC's present in gases and aqueous solutions. The aqueous phase CVOC's are removed by volatilizing into a gaseous carrier. The gas was then passed through silica gel and simultaneously irradiated with UV light and/or exposing the bed to ozone. The system required a great excess of ozone, using 2% ozone to decompose TCE at air compositions of only 50 parts per billion (ppb) to 700 ppb, which is generally uneconomic.

Accordingly, it is a principle object of the present invention to provide a process for efficient destruction of contaminants in a gaseous stream such as air utilizing a two step process.

It is a further object of the present invention to provide a process as mentioned above which comprises a photocatalytic step followed by a catalytic step.

SUMMARY OF THE INVENTION

The foregoing objects are achieved by way of the present invention wherein a process comprises passing a contaminated gaseous stream through a photocatalytic stage and, thereafter, through a catalytic stage.

In accordance with the present invention the process for purifying a contaminated gas stream by conversion of the contaminants into less harmful products, comprises the steps of providing a photocatalytic stage having a photocatalyst and a source of UV radiation, providing a catalytic stage downstream of the photocatalytic stage wherein the catalytic stage has a further catalyst and passing the contaminated gas stream serially through said photocatalytic stage by contacting the gas stream with the photocatalyst while irradiating the gas stream and the photocatalyst with UV radiation to convert a portion of the contaminants to oxidized species and thereafter passing the treated gas stream to a catalytic stage wherein the gas stream is passed over a catalyst so as to further convert the oxidized species and remaining contaminants to less harmful products. The gas stream is irradiated in the photocatalytic stage with ultraviolet light having a wavelength of between 150 to about 400 nanometers and the contaminated gas stream has a residence time in the photocatalytic stage of between about 0.001 to about 5 seconds, where the residence time is defined as the ratio of the volume of the photocatalyst to the total volumetric flow rate of the contaminated gas stream. The process is carried out in the photocatalytic stage at a temperature of between about 20° F. to 1200° F. and a pressure of between about 0.2 atm to about 10 atm. The photocatalyst employed in the photocatalytic stage is a particular photocatalyst as described hereinbelow. The catalytic stage is operated at a temperature of between about 200° F. and 1200° F. and a pressure of between about 0.02 atm to 10 atm. The residence time of the gas stream in the catalytic stage is between 0.001 to about 5 seconds, where the residence time is defined as the ratio of the volume of the catalyst to the total volumetric flow rate of the gaseous stream. The details of the preferred catalyst employed in the catalytic stage is described hereinbelow.

The process of the present invention is both economic and efficient and superior to known processes.

Further objects and advantages of the present invention will appear from the detailed description.

DETAILED DESCRIPTION

The present invention provides a gaseous phase oxidation system, using only oxygen contained in the inlet to the process as the oxidant, which operates at a surprisingly lower contact time with higher selectivity than prior art photocatalytic systems. The absence of any added oxidant, such as ozone or hydrogen peroxide, provides a simpler, lower cost process. The contact time, defined as the ratio of the catalyst bulk volume to the volumetric flow rate of the entering fluid, is an important commercial parameter of the invention. A low contact time is equivalent to a low catalyst volume when processing a given flow rate of fluid. If the contact time is reduced by a factor of ten, not only is the required volume of catalyst reduced by a factor of ten, but also the number of UV lamps and ballasts are proportionately reduced and the size of the reactor is proportionately reduced. These latter considerations greatly reduce the cost of construction and operation of the photocatalytic fluid purification process of the present invention, compared to the prior art. As will be exemplified below, a photocatalytic contact time of less than 0.1 seconds can be utilized with the present invention, compared to contact times as high as 34 to 100 seconds with prior art titania photocatalysts. The present invention thereby enables a surprisingly high 300 to 1000-fold size reduction and a proportionate cost reduction compared to that of the prior art. An improvement of this magnitude would not be expected by those skilled in the art.

It is believed that the exceptional results of the photocatalysts of the present invention are due to four characteristics of the invention:

(a) a high photocatalytic activity of the photocatalysts of the present invention, which oxidize at least a portion of the contaminant in the incoming air, thereby producing some oxygenated products along with a heat of reaction;

(b) the elevated temperature of the photocatalyst which results from this reaction heat release further increases the photocatalytic activity;

(c) the oxygenated products from the photocatalytic bed and remaining contaminants can be oxidized by the catalytic bed at lower temperatures than can the original parent contaminant; and (d) the heat release to the following catalytic bed increases its operating temperature and thereby its activity for contaminant destruction. The overall result is the use of extremely short residence times, enabling the photocatalytic technology to emerge as a cost effective environmental control option for treating large volumes of contaminated air. Further, the system can be operated to completely oxidize contaminants in an air stream thus avoiding byproducts, using inlet air at ambient temperatures instead of the requirement of preheating the air stream to, say, 600° F. as required in conventional catalytic processing.

The process of the present invention comprises the steps of:

(a) providing a photocatalytic stage having a photocatalyst and a source of UV radiation;

(b) providing a catalytic stage downstream of the photocatalytic stage, the catalytic stage having a catalyst;

(c) passing the contaminated gas stream through the photocatalytic stage by contacting the gas stream with the photocatalyst while irradiating the contaminated gas stream and the photocatalyst with UV radiation so as to oxidize at least a portion of said contaminants to an oxidized species;

(d) removing the gas stream with the oxidized species of contaminants from the photocatalytic stage; and (e) passing the gas stream with oxidized species of contaminants through the catalytic stage by passing the stream over the catalyst at elevated temperature so as to further convert the oxidized species and remaining contaminants to less harmful biproducts.

In accordance with the process of the present invention, the process includes repeating steps (c) through (e) a plurality of times. Thus, the process provides a plurality of alternating photocatalytic and catalytic stages in series.

In accordance with a preferred embodiment of the present invention, the gas stream is irradiated with ultraviolet light in the photocatalytic stage wherein the ultraviolet light has a wavelength of between about 150 to about 400 nanometers, preferably between 250 to about 375 nanometers. The source of the ultraviolet light may be low pressure ultraviolet bulbs or medium pressure ultraviolet bulbs. Medium pressure ultraviolet bulbs are preferred when the photocatalytic stage is operated at a temperature of greater than about 200° F. In accordance with the process of the present invention, the photocatalytic stage is operated under the following conditions: a temperature of between about 20° F. to about 1200° F., preferably 50° F. to 1000° F. and still more preferably between about 100° F. to 800° F. and a pressure of between about 0.2 atm to 10 atm, preferably between about 0.8 atm to about 1.5 atm. The residence time of the contaminated gas in the photocatalytic stage is preferably between about 0.001 to about 5 seconds and preferably between about 0.01 to 2 seconds, where the residence time is defined as the ratio of the volume of photocatalyst to the total volumetric flow rate of the contaminated gas.

It has been found that the photocatalyst employed in the photocatalytic stage is critical for optimizing the process of the present invention. In accordance with the present invention the preferred photocatalyst is selected from the group consisting of:

(a) from about 0.01 to about 8.0 wt. % titania, from about 0.01 to about 8.0 wt. % zirconia, and balance essentially silica;

(b) an element selected from the group consisting of platinum, palladium and mixtures thereof in an amount of between about 0.01 to about 5.0 wt. %, balance essentially silica;

(c) from about 0.01 to about 8.0 wt. % titania, from about 0.01 to about 8.0 wt. % zirconia, and an element selected from the group consisting of platinum, palladium and mixtures thereof in an amount of between about 0.01 to about 5.0 wt. %, balance essentially silica;

(d) an element selected from the group consisting of platinum, palladium and mixtures thereof in an amount of between about 0.01 to about 5.0 wt. %, and balance essentially titania;

(e) an element selected from the group consisting of gold, silver and mixtures thereof in an amount of between about 0.01 to about 5.0 wt. %, and balance essentially titania; and (f) from about 10.0 to about 50.0 wt. % tungsten oxide, from about 0.1 to about 70.0 wt. % silica, from about 30.0 to about 90.0 wt. % titania, and an element selected from the group consisting platinum, palladium and mixtures thereof in an amount of between about 0.01 to about 5.0 wt. %.

A particularly preferred photocatalyst comprises titania, and an element selected from the group consisting of platinum, palladium and mixtures thereof. A particularly suitable photocatalyst is a photocatalyst which comprises from about 0.1 wt. % to about 70 wt. % silica, from about 30 wt. % to about 90 wt. % titania, from about 20 wt. % to about 30 wt. % tungsten oxide, and an element selected from the group consisting of platinum, palladium and mixtures thereof in an amount of between about 0.01 wt. % to about 5.0 wt. %.

The second catalytic stage for the process of the present invention is operated under the following conditions: a temperature of between about 200° F. to about 1200° F., preferably 300° F. to 1000° F., and a pressure of between about 0.2 atm to about 10 atm, preferably, between about 0.8 atm to about 1.5 atm. The residence time of the gaseous stream with the catalyst in the catalytic stage is between about 0.001 to about 5 seconds, preferably between about 0.01 to about 5 seconds, where the residence time is defined as the ratio of the volume of the catalyst to the total volumetric flow rate of the stream.

It has been found that the catalyst provided in the catalytic stage in accordance with the process of the present invention is critical in optimizing the efficiency of the process of the present invention. When the contaminated gas stream contains no halogens, preferred catalysts are selected from the group consisting of:

(a) an element selected from the group consisting of platinum, palladium and mixtures thereof in an amount of between about 0.01 to about 5.0 wt. %, and balance essentially a component selected from the group consisting of alumina, silica and mixtures thereof;

(b) an element selected from the group consisting of platinum, palladium and mixtures thereof in an amount of between about 0.01 to about 5.0 wt. %, and balance essentially titania;

(c) from about 10.0 to about 50.0 wt. % tungsten oxide, from about 0.1 to about 70.0 wt. % silica, from about 30.0 to about 90.0 wt. % titania, and an element selected from the group consisting platinum, palladium and mixtures thereof in an amount of between about 0.01 to about 5.0 wt. %; and (d) from about 25 to about 90 wt. % manganese oxide, from about 0.5 to about 40 wt. % copper oxide and from about 0.5 to about 40 wt. % alumina.

When the catalyst defined in paragraph (d) above is employed, it is preferred that the manganese oxide, copper and alumina be coprecipitated. It has been found that the activity of catalyst (d) can be increased by coprecipitation rather than attempting to impregnate the alumina with the high wt. % of magnesium oxide.

When the contaminated gas contains halogen atoms, the preferred catalyst of the present invention is selected from the group consisting of:

(a) an element selected from the group consisting of platinum, palladium and mixtures thereof in an amount of between about 0.01 to about 5.0 wt. %, and balance essentially titania;

(b) an element selected from the group consisting of platinum, palladium and mixtures thereof in an amount of between about 0.01 to about 5.0 wt. %, balance essentially silica; and (c) from about 10.0 to about 50.0 wt. % tungsten oxide, from about 0.1 to about 70.0 wt. % silica, from about 30.0 to about 90.0 wt. % titania, and an element selected from the group consisting platinum, palladium and mixtures thereof in an amount of between about 0.01 to about 5.0 wt. %.

When employing a catalyst containing silica, it has been found that silica gels are preferred. Preparation of silica gels are well known in the art as for example described in co-pending application Ser. No. 09/262,895 filed Mar. 8, 1999 and assigned to the assignee of the instant invention.

The contaminated air may be contacted with the photocatalyst in the photocatalytic stage and the catalyst in the catalytic stage in any fashion known to those skilled in the art. Preferably, the fluid is passed over layered beds of the photocatalyst and/or catalyst with, in the photocatalytic stage, ultraviolet light sources being placed between the layered beds. An alternate configuration is to illuminate the photocatalyst by embedding the light bulbs in a packed bed of the photocatalyst, preferably when the light bulbs are enclosed in a quartz sleeve.

The catalyst of the present invention can be prepared by any method known in the prior art, such as impregnation, precipitation, or any other method known in the art.

Advantages of the present invention will be made clear from the following examples.

EXAMPLE 1

A stainless steel reactor with a cross section of about 6 inches by 10 inches was constructed, containing a top photocatalytic bed and a lower catalytic bed. Air flow containing the contaminant was introduced at the top of the reactor, flowing first through the photocatalytic bed and next through the catalyst bed. Five medium pressure UV bulbs were placed in a row above the photocatalyst bed, at a distance of about 0.5 inches above the photocatalyst. The wattage of the five bulbs placed along the 10 inch dimension of the reactor was 400, 340, 220, 340, and 400, for a total wattage of 1,700 watts. The photocatalyst bed was a depth of 1 inch, with a six inch by 10 inch cross section, or a total volume of 980 cc. The photocatalyst bed was titania pellets impregnated with platinum to a level of 1% by weight. After a five inch mixing zone below the photocatalyst bed, the contaminated air flowed through the catalyst bed, containing titania pellets impregnated with platinum to a level of 1% by weight. The depth of the catalyst bed was 5 inches, or a total volume of 4,900 cc.

Air at a temperature of 74° F. was contaminated with pentane, to a concentration of 3,265 ppm by volume. The contaminated air was fed to the reactor at a rate of 22 cubic feet per minute, passing serially over the photocatalyst bed and then the catalyst bed. With the UV lamps illuminated, 1,700 watts of electrical energy entered the reactor, which would be sufficient to heat the incoming contaminated air by about 200° F.

Measurements of the inlet and exit pentane concentration from the photocatalytic/catalytic reactor were made, showing an outlet pentane concentration of 1 ppm. Compared to the inlet concentration of 3,265 ppm, this represents a destruction efficiency of 99.97%. No byproducts were observed from the reactor exit gas analyses. The temperature profile in the system suggested that a substantial conversion was achieved in the photocatalytic bed, of over two-thirds of the total conversion, with the balance being achieved in the catalytic bed. The residence time in the photocatalytic bed is only 0.09 seconds, representing a space velocity of over 38,000 hr$^{-1}$.

The results are surprising and unexpected. The residence time of the photocatalytic bed is too small to expect substantial conversion, 0.09 seconds, because most photocatalysts require residence times of several seconds to be effective for even chlorinated hydrocarbons, which are easier to convert than is pentane. Further, the temperature of the air heated by the UV lamps is too low to expect substantial conversion in the catalyst bed. Yet, by combining these two negative expectations, a highly positive result was achieved with 99.97% destruction efficiency without byproducts. It is believed that the photocatalyst is producing partially oxygenated byproducts, which are particularly easily converted in the catalytic section. In addition, the heat of reaction which is produced serves to elevate the temperature of both the photocatalyst and the catalyst sections to promote the rate of reaction, even though the overall energy input into the system was only 1,700 watts, or equal to a about 200° F. temperature rise.

EXAMPLE 2

The reactor of Example 1 was employed to destroy methyl chloride in air, which is known to be a particularly difficult compound to oxidize by photocatalysis. An air stream of 7 SCFM was fed to the reactor of Example 1, containing 288 ppm (vol.) of methyl chloride. The reactor was operated under the conditions of Example 1. The observed destruction efficiency of methyl chloride was 99.5%, far higher than would be expected by the use of either photocatalysis or catalysis alone. Also, no byproducts were observed by analysis of the reactor effluent by gas chromatography.

EXAMPLE 3

The reactor of Example 1 was employed to destroy methylene chloride in air, which is known to be a particularly difficult compound to oxidize by photocatalysis. An air stream of 10 SCFM was fed to the reactor of Example 1, containing 369 ppm (vol.) of methylene chloride. The reactor was operated under the conditions of Example 1. The observed destruction efficiency of methylene chloride was 99.3%, far higher than would be expected by the use of either photocatalysis or catalysis alone. Also, no byproducts were observed by analysis of the reactor effluent by gas chromatography.

EXAMPLE 4

A stainless steel reactor with a cross section of 2 inches by 7.5 inches was constructed, containing a top photocatalytic bed and a lower catalytic bed. Air flow containing the contaminant was introduced at the top of the reactor, flowing first through the photocatalytic bed and next through the catalyst bed. One medium pressure, 400 watt UV bulb was placed above the photocatalyst bed, at a distance of about 0.5 inches above the photocatalyst. The photocatalyst bed was filled to a depth of about 1 inch, with a total weight of 131.2 grams. The photocatalyst bed composition was 0.012% titania, 0.01% zirconia, 1% platinum, and the balance silica, all on a weight basis. After the photocatalyst bed, the contaminated air flowed through the catalyst bed, containing 632.1 grams of a catalyst of about 70% manganese dioxide, 12% copper oxide, and the balance alumina.

Air at a temperature of about 74° F. was contaminated with hexane, to a concentration of 625 ppm by volume. The contaminated air was fed to the reactor at a rate of 1.9 cubic feet per minute, passing over the photocatalyst bed and then the catalyst bed.

Measurements of the inlet and exit hexane concentration from the photocatalytic/catalytic reactor were made, showing an outlet hexane concentration of 2.6 ppm. Compared to the inlet concentration of 625 ppm, this represents a destruction efficiency of 99.6%. No byproducts were observed from the reactor exit analyses.

EXAMPLE 5

The reactor of Example 4 was employed to destroy hexane in air, except the photocatalyst of Example 4 was replaced with the photocatalyst of Example 1. The catalyst of Example 4 was also used in this present Example 5. An air stream of 2.2 SCFM at about 70° F. was fed to the reactor, containing 832 ppm (vol.) of mixed hexanes. The observed destruction efficiency of hexanes was 99.9%. No byproducts were observed by analysis of the reactor effluent by gas chromatography.

The performance of this system is substantially superior to that expected by the use of either photocatalysis or catalysis alone under these experimental conditions. In particular, little destruction of hexanes to carbon dioxide is usually achieved by photocatalysis alone, and catalysis alone would require preheating the air to a temperature of over 600° F. The combination of the two steps with the claimed catalysts provides exceptional results.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

The invention claimed is:

1. A catalyst for converting contaminants in a gas stream comprises a catalytically active support comprising from about 0.1 wt. % to about 70 wt. % silica, from about 30 wt. % to about 90 wt. % titania, from about 10 wt. % to about 50 wt. % tungsten oxide and an element selected from the group consisting of platinum, palladium and mixtures thereof in an amount of between about 0.01 wt. % to about 5.0 wt. %.

2. A catalyst according to claim 1, wherein said tungsten oxide is present is an amount of between about 20 wt. % to about 30 wt. %.

* * * * *